3,681,020
Patented Aug. 1, 1972

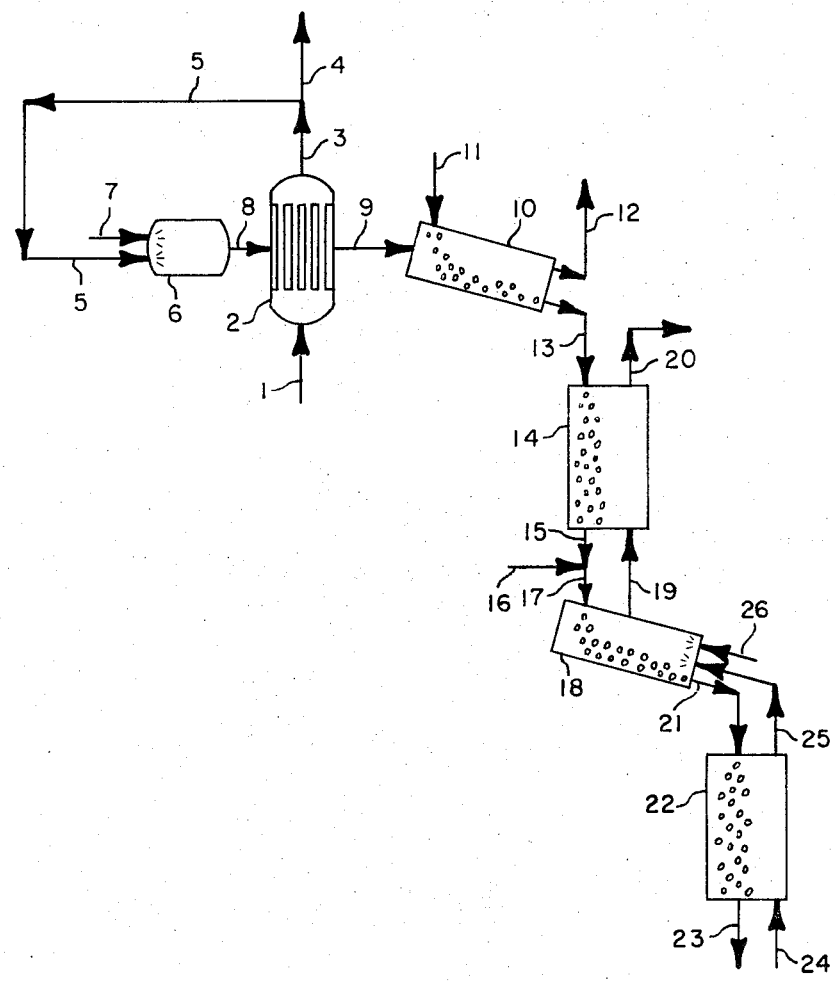

3,681,020
THERMAL CONVERSION OF MAGNESIUM SULFITE TO MAGNESIUM OXIDE
Indravadan S. Shah, Forest Hills, N.Y., assignor to Chemical Construction Corporation, New York, N.Y.
Filed June 11, 1970, Ser. No. 45,512
The portion of the term of the patent subsequent to May 4, 1988, has been disclaimed
Int. Cl. C01f 5/12
U.S. Cl. 23—201              12 Claims

ABSTRACT OF THE DISCLOSURE

Hydrated solid magnesium sulfite, typically derived from the scrubbing of a waste gas stream with magnesium oxide-sulfite slurry for slufur dioxide removal, is converted to solid magnesium oxide and a sulfur dioxide-rich gas stream by a combination of steps including drying to form anhydrous magnesium sulfite by heating the wet hydrated crystals to 300° C. to 700° C. in a non-oxidizing atmosphere, followed by addition of carbon to the anhydrous salt and calcining of the mixture under controlled conditions. The process produces regenerated magnesium oxide and the sulfur dioxide-rich gas stream without oxidation of sulfite to sulfate, and without sulfur trioxide formation.

BACKGROUND OF THE INVENTION

Field of the invention

The invention relates to the removal of sulfur dioxide from gas streams such as waste or flue gases, to recover the sulfur dioxide and prevent air pollution. A circulating aqueous magnesium oxide-sulfite slurry is employed to scrub the gas stream, with the resultant formation of further magnesium sulfite, and a bleed stream of aqueous slurry is withdrawn and filtered or centrifuged to produce wet solids consisting essentially of hydrated magnesium sulfite crystals containing excess free water. The wet solids are dried to form anhydrous magnesium sulfite and are then calcined, with the drying and calcining taking place under controlled conditions, to generate a sulfur dioxide-rich gas stream and regenerated magnesium oxide. The invention is particularly applicable to installations involving the scrubbing of waste gas streams, such as stack or flue gases from a power boiler, or other waste gases such as the tail gas from a sulfuric acid process, smelter off-gases etc., to prevent air pollution. The process of the present invention provides an improvement in the processing of the hydrated magnesium sulfite by drying and calcining, so as to produce regenerated magnesium oxide and a sulfur dioxide-rich gas stream without oxidation of magnesium sulfite to sulfate, and without the production of sulfur trioxide.

Description of the prior art

In recent years, the scrubbing of waste gases such as flue or stack gases, or tail gases from chemical processes such as sulfuric acid manufacture, to remove sulfur dioxide and prevent air pollution, has assumed increasing importance. The use of aqueous magnesium oxide-sulfite or aqueous magnesium sulfite-bisulfite solutions or slurries for this purpose is generally described in U.S. patent applications Nos. 737,186 filed June 14, 1968 now U.S. Pat. No. 3,617,212; 772,547 filed Nov. 1, 1968 now U.S. Pat. No. 3,622,270; 14,947 filed Feb. 27, 1970, and 14,948 filed Feb. 27, 1970, now U.S. Pat. No. 3,622,270. Other disclosures include Chemical Processing vol. 33, No. 1, issue for January 1970, page 47, U.S. Pats. Nos. 3,428,420; 3,284,435; 3,273,961; 3,092,535 and 3,046,182; Canadian Pat. No. 822,001 and British Pat. No. 708,095. The calcining of zinc sulfite or the like is suggested in U.S. Pat. No. 2,161,056.

SUMMARY OF THE INVENTION

In the present invention, hydrated solid magnesium sulfite crystals containing excess free water are thermally converted to regenerated magnesium oxide and a sulfur dioxide-rich gas stream by an improved sequence and under controlled conditions, which prevent the oxidation of magnesium sulfite to magnesium sulfate and also prevent formation of sulfur trioxide. The wet hydrated magnesium sulfite crystals are initially heated and dried in a non-oxidizing atmosphere at a temperature generally in the range of 300° C. to 700° C., to evolve free and combined water and convert the magnesium sulfite to the anhydrous state. Solide particulate carbon is added to the anhydrous magnesium sulfite to form a mixture containing at least 0.5% to 2% carbon, and the mixture is heated to a temperature generally in the range of 750° C. to 1300° C. in calcining means in which a hot non-oxidizing atmosphere containing at least 0.8% by volume of carbon monoxide and less than 1% by volume of free oxygen is maintained by burning a fluid hydrocarbon fuel with air. Product sulfur dioxide-rich gas is withdrawn from the calcining means, as well as regenerated product solid magnesium oxide.

A principal advantage of the invention is that the wet hydrated magnesium sulfite is converted to the anhydrous form without oxidation to sulfate, and the anhydrous magnesium sulfite is converted to magnesium oxide without oxidation, so that a sulfur dioxide-rich gas is produced free of sulfur trioxide. The conversion of the hydrated magnesium sulfite to the anhydrous state without oxidation simplifies the subsequent calcination, since magnesium sulfate is more difficult to convert to magnesium oxide than the sulfite form of the salt, and it requires more b.t.u. and coke to decompose magnesium sulfate.

It is an object of the present invention to process wet hydrated magnesium sulfite and produce magnesium oxide and a sulfur dioxide-rich gas stream in an improved manner.

Another object is to convert wet hydrated magnesium sulfite to the anhydrous state without oxidation to magnesium sulfate.

A further object is to recover a sulfur dioxide-rich gas stream from magnesium sulfite without the formation of sulfur trioxide.

An additional object is to dry and then calcine wet hydrated magnesium sulfite under controlled conditions which attain conversion of the magnesium sulfite to magnesium oxide and sulfur dioxide in an improved manner.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. Air stream 1 is passed through gas-to-gas heat exchanger 2, which is a combination air preheater and flue gas cooler-conditioner, as will appear infra. The air stream is heated in unit 2 and discharged via stream 3 at a temperature typically in the range of 100° C. to 300° C. Stream 3 is divided into stream 4, which may be discharged to atmosphere or usefully employed, and stream 5 which is passed into combustion chamber 6 together with fluid hydrocarbon fuel stream 7, which is burned in chamber 6. A substantially stoichiometric proportion of stream 7 relative to stream 5 is provided, so that a hot non-oxidizing gas is produced in unit 6. Stream 7 may be any suitable fluid hydrocarbon fuel, such as methane, natural gas, propane, butane, naphtha, fuel oil, refinery residual oil derived from petroleum refining or crude oil, or a combination of these fuels. In any case, stream 7 is burned in chamber 6 and the resulting hot non-oxidizing or reducing flue gas stream 8 produced at a temperature typically in the range of 400° C. to 900° C. is passed into unit 2 and in indirect heat exchange with air, so that a conditioned and somewhat cooler flue gas stream 9 is produced at a temperature typically in the range of 300° C. to 700° C., and preferably in the range of 300° C. to 450° C.

Conditioned flue gas stream 9 is now employed in accordance with the present invention. Stream 9 is passed into dryer 10, which may in practice consist of a rotary, tray or shelf dryer or the like, or a fluidized bed system. Stream 11 consisting of a solid stream of wet hydrated magnesium sulfite particles is also passed into unit 10. Stream 11 generally contains up to about 5% excess free water, and the hydrated magnesium sulfite is preferably present in the trihydrate form although some hexahydrate may be present in stream 11, as well as small proportions of magnesium sulfate and magnesium oxide. Stream 11 is heated to a temperature generally in the range of 300° C. to 700° C. in the non-oxidizing atmosphere within unit 10 by direct contact with gas stream 9, and the hydrated magnesium sulfite is converted to the anhydrous form without evolution of sulfur dioxide and without oxidation of magnesium sulfite to magnesium sulfate. Preferable operating conditions within unit 10 include a temperature in the range of 300° C. to 450° C. and a residence time interval for the solid phase within unit 10 of less than 30 minutes, or in the range of 10 to 25 minutes. In some instances, a small proportion of solid particulate elemental carbon, such as ground coal, charcoal or coke or the like may be added to stream 11 prior to passing stream 11 into unit 10, so as to assist in maintaining a reducing atmosphere within unit 10 and thereby preventing magnesium sulfite oxidation to magnesium sulfate. The resulting cooled flue gas produced in unit 10 by direct contact with stream 11, and containing evolved free and combined water, is discharged via stream 12 at a temperature typically in the range of 100° C. to 300° C. The substantially anhydrous and dried magnesium sulfite produced in unit 10 is discharged via stream 13, which is further processed in accordance with the present invention. This can be shipped to another location for processing.

Stream 13 passes downwards through direct contact preheater 14 in which the dry solids are heated by direct contact with hot product sulfur dioxide-rich gas. The heated particulate solids stream 15 discharged from unit 14 is combined with solid particulate elemental carbon stream 16, which preferably consists of powdered or ground coke or coal, and the resulting combined solids mixture stream 17 contains at least 0.5% to 2% carbon by weight and preferably in the range of 2% to 5% carbon by weight, balance principally anhydrous magnesium sulfite. As mentioned supra, a small proportion of magnesium sulfate and/or magnesium oxide may be initially present in stream 11, in which case stream 17 will also contain a minor proportion of these components.

Stream 17 now passes into calciner 18, which may be a rotary kiln, fluidized solids bed reactor, or the like. The solids feed mixture stream 17 is calcined or roasted in unit 18 at a temperature generally in the range of 750° C. to 1300° C. and preferably in the range of 800° C. to 1150° C. In instances when a substantial proportion of magnesium sulfate may be present in stream 17, somewhat higher temperatures in the range of 1000° C. to 1200° C. will be maintained in unit 18, in order to convert magnesium sulfate to magnesium oxide and a sulfur dioxide-rich gas phase. In any case, a non-oxidizing atmosphere is maintained in unit 18, of specific composition as will appear infra, and under these conditions of non-oxidizing or reducing atmosphere and elevated temperature, solid magnesium sulfite is converted to solid magnesium oxide and sulfur dioxide, with a hot sulfur dioxide-rich gas stream being formed in unit 18 and removed via stream 19, which is typically at a temperature in the range of 600° C. to 1200° C. and generally contains in the range of about 3% to 30% sulfur dioxide content by volume. Stream 19 passes through unit 14 and preheats the solid phase, and the resulting cooled sulfur dioxide-rich gas stream 20 is passed to further processing for the recovery of sulfur values. In some cases stream 20 will be passed directly to a sulfuric acid plant for conversion of the sulfur dioxide to sulfuric acid, or stream 20 may be compressed and/or refrigerated to produce product liquid sulfur dioxide. The sulfur dioxide content of stream 20 may also be converted to elemental sulfur by the Claus reaction, by initially converting a portion of the sulfur dioxide to hydrogen sulfide followed by catalysis. In any case, a valuable sulfur-containing product is produced from stream 20.

Returning to unit 18, a hot solid particulate magnesium oxide stream 21 is discharged from unit 18 and preferably passed through direct contact heat exchanger 22 for cooling by direct contact with process air. The cooled solid magnesium oxide stream 23 discharged from unit 22 is a product of the process, and stream 23 may be employed for any suitable magnesium oxide usage. Stream 23 is preferably employed as makeup magnesium oxide which is added to a circulating aqueous magnesium oxide-sulfite slurry which is employed to scrub a waste or flue gas for sulfur dioxide removal. The solids portion of a bleed stream from the circulating slurry is processed for regeneration via stream 11.

Ambient process air stream 24 is passed through unit 22 in contact with the hot solids, and the resulting heated air stream 25 typically at a temperature in the range of 100° C. to 500° C. is passed to unit 18 to support the combustion of fluid hydrocarbon fuel stream 26 within unit 18. Stream 26 is any suitable fluid hydrocarbon fuel, such as those materials mentioned supra, and stream 26 is preferably similar in composition to stream 7. The combustion of stream 26 within unit 18 by reaction with stream 25 serves to generate a hot non-oxidizing or reducing atmosphere within unit 18 at the temperature levels mentioned supra, and the atmosphere within unit 18 contains at least 0.8% to 3%, and up to 5% by volume of carbon monoxide and less than 1% by volume of free oxygen, so that solid magnesium sulfite is converted to solid magnesium oxide and a gas stream rich in sulfur dioxide within unit 18, which is withdrawn via stream 19 as described supra. Because of the maintenance of non-oxidizing conditions within unit 18, incorporation of particulate elemental carbon in stream 17, and the maintenance of specific temperature levels as described supra, the sulfur dioxide-rich stream 19 is evolved and withdrawn essentially free of sulfur trioxide. The prevention of sulfur trioxide formation in unit 18 is very important, since formation of sulfur trioxide would result in the subsequent formation of a troublesome sulfuric acid mist during subsequent processing of stream 20. A residence time of the solids in unit 18 of from 40 to 80 minutes was found to be optimum, in order to convert all of the magnesium sulfite and any magnesium sulfate which may be present in stream 17 into magnesium oxide and sulfur dioxide.

Numerous alternatives within the scope of the present invention will occur to those skilled in the art. All of stream 3 may be utilized via stream 5, in which case stream 4 would be omitted. In other instances, stream 4 could be utilized as a component of stream 24, or passed directly into unit 18 to support combustion of stream 26. Stream 8 may be cooled and conditioned by indirect heat exchange with liquid water to generate steam, in which case stream 1 would be liquid water and steam stream 3 would be employed for a suitable process or heating usage. Stream 8 may be directly generated by the requisite temperature for drying in unit 10, in which case unit 2 would be omitted. Stream 11 may be provided as wet hydrated magnesium sulfite devoid of magnesium sulfate, in which case a somewhat lower temperature within the range enumerated supra could be maintained in unit 18. Units 14 and 22 may be omitted in some instances, in which case stream 13 may enter directly in 18 and stream 19 will be processed for sulfur recovery.

An example of testing of the operating conditions of the present invention will now be described.

EXAMPLE

In application of the system for a typical industrial installation, the following are the compositions and flow rates of principal process streams.

| Stream No. | Temp., °C. | Component and flow rate or composition |
|---|---|---|
| 1 | 20 | Air: 2832 ACMM (actual cubic meters/minute). |
| 7 | 25 | Fuel oil: 9.45 liters/minute. |
| 11 | 30 | $MgSO_3 \cdot 6H_2O$: 87 kg./min. |
| 11 | 30 | $MgSO_4 \cdot 7H_2O$: 5 kg./min. |
| 11 | 30 | MgO: 5 kg./min. |
| 11 | 30 | $H_2O$: 5 kg./min. |
| 12 | 200 | Flue gas: 445 ACMM. |
| 13 | 320 | MgO: 5.0 kg./min. |
| 13 | 320 | $MgSO_3$: 42.2 kg./min. |
| 13 | 320 | $MgSO_4$: 2.3 kg./min. |
| 16 | 20 | Coke: 0.5 kg./min. |
| 19 | 650 | $SO_2$: 16.0% by volume |
| 19 | 650 | CO: 1.8% by volume |
| 19 | 650 | $O_2$: 0.5% by volume |
| 19 | 650 | $CO_2$: 13.0% by volume |
| 19 | 650 | Inerts($N_2$ etc.): Balance. |
| 21 | 700 | MgO: 22 kg./min. |
| 24 | 20 | Air: 28.32 ACMM. |
| 26 | 25 | Fuel o.l: 7.57 liters/min. |

In testing of the reaction in unit 18, the presence of about 1% oxygen and 3% carbon monoxide in the gas stream, together with coke via stream 16 resulted in essentially complete decomposition of magnesium sulfite and no formation of sulfur trioxide. At a hot zone temperature of 1240° C., and in a reducing atmosphere of 2% carbon monoxide, essentially complete calcination was attained.

Feed material containing 0, 2.3 and 4.7% by weight of carbon (dry basis) was tested. At 2.3% carbon, complete calcination was attained and the flue gas contained 0.8 to 2% carbon monoxide and 1% oxygen. Final sulfur content was 0.22%, reported as sulfur trioxide. With no carbon, the final sulfur content was 2.1% even though the kiln atmosphere contained 1% oxygen and 2 to 3% carbon monoxide.

I claim:

1. A process for the conversion of hydrated solid magnesium sulfite containing excess free water to solid magnesium oxide and a sulfur dioxide-rich gas stream which comprises heating said hydrated solid magnesium sulfite to a temperature in the range of 300° C. to 700° C. in a non-oxidizing atmosphere, whereby free and combined water are evolved into said non-oxidizing atmosphere and substantially anhydrous magnesium sulfite is produced, and evolution of sulfur dioxide and formation of magnesium sulfate from magnesium sulfite are substantially prevented, adding solid particulate elemental carbon to said substantially anhydrous magnesium sulfite, whereby a solid carbon magnesium sulfite mixture containing at least 0.5% carbon by weight is produced, heating said mixture to a temperature in the range of 750° C. to 1300° C. in calcining means, burning a fluid hydrocarbon fuel with air in said calcining means to heat said mixture, whereby a non-oxidizing atmosphere containing at least 0.8% by volume of carbon monoxide and less than about 1% by volume of free oxygen is maintained in said calcining means, and withdrawing from said calcining means a product sulfur dioxide-rich gas stream substantially free of sulfur trioxide, and product solid magnesium oxide substantially free of sulfur.

2. The process of claim 1, in which said hydrated solid magnesium sulfite contains a small proportion of solid magnesium sulfate, and said solid magnesium sulfate is converted to magnesium oxide and gaseous sulfur dioxide in said calcining means.

3. The process of claim 1, in which said hydrated solid magnesium sulfite is heated in a non-oxidizing atmosphere to produce said substantially anhydrous magnesium sulfite at a temperature in the range of 300° C. to 450° C. for a time interval of less than 30 minutes.

4. The process of claim 1, in which a small proportion of solid particulate elemental carbon is added to said hydrated solid magnesium sulfite prior to heating said hydrated solid magnesium sulfite to produce said anhydrous magnesium sulfite.

5. The process of claim 1, in which said non-oxidizing atmosphere maintained during said heating of said hydrated magnesium sulfite is produced by burning a fluid hydrocarbon fuel with a substantially stoichiometric proportion of air.

6. The process of claim 1, in which said solid particulate elemental carbon is coke.

7. The process of claim 1 in which said solid particulate elemental carbon comprises ground coal.

8. The process of claim 1, in which said solid carbon-magnesium sulfite mixture contains in the range of 2% to 5% carbon by weight.

9. The process of claim 1, in which said solid carbon-magnesium sulfite mixture is initially passed in direct contact with said product sulfur dioxide-rich gas stream prior to heating said mixture in said calcining means, whereby said mixture is preheated and said product sulfur dioxide-rich gas stream is cooled.

10. The process of claim 1, in which said air is initially passed in direct contact with said product solid magnesium oxide, prior to using said air to burn said fluid hydrocarbon fuel, whereby said air is preheated and said product solid magnesium oxide is cooled.

11. The process of claim 1, in which said mixture is heated in said calcining means to a temperature in the range of 800° C. to 1150° C.

12. The process of claim 1, in which said fluid hydrocarbon fuel is selected from the group consisting of methane, natural gas, propane, butane, naphtha, fuel oil, refinery residual oil and crude oil.

References Cited

UNITED STATES PATENTS

| | | | |
|---|---|---|---|
| 3,577,219 | 5/1971 | Shah | 23—168 |
| 3,561,922 | 2/1971 | Allen et al. | 23—201 |
| 3,273,961 | 9/1966 | Rogers et al. | 23—25 XQ |
| 2,141,228 | 12/1938 | Singh | 23—177 X |
| 2,776,191 | 1/1957 | Gloss | 23—201 |

OTHER REFERENCES

Chemical Abstracts; V. A. Pinaev, Vestn. Tekhn. i Ekon. Inform. Nauchn.—issued. Gos. Kom. Sov. Min. SSSR poKHIM. 1962 (5) 51–6; V. 59 (1963).

OSCAR R. VERTIZ, Primary Examiner

G. ALVARO, Assistant Examiner

U.S. Cl. X.R.

23—178